Jan. 23, 1968   R. E. OBENHAUS   3,365,618
THERMALLY RESPONSIVE PROTECTION CIRCUIT
Filed Oct. 21, 1965   3 Sheets-Sheet 1

Robert E. Obenhaus,
Inventor.
Koenig, Senniger,
Powers and Leavitt,
Attorneys.

United States Patent Office 3,365,618
Patented Jan. 23, 1968

3,365,618
THERMALLY RESPONSIVE PROTECTION
CIRCUIT
Robert E. Obenhaus, South Easton, Mass., assignor to Texas Instruments Incorporated, Dallas, Tex., a corporation of Delaware
Filed Oct. 21, 1965, Ser. No. 499,169
10 Claims. (Cl. 317—41)

This invention relates to thermal sensors and more particularly to such sensors which provide an anticipatory response to rapid rates of temperature rise for actuating electrical overload protectors so as to prevent temperature overshoot.

Increasing use is being made of thermistors as sensors for the thermal overload protection of electrical apparatus such as induction motors. These sensors, when used with sensitive electronic overload protectors, can be made quite small so that they have relatively low thermal inertia and can follow temperature changes of a motor winding quite closely. However, under conditions of very rapid temperature rise, such as occur during locked rotor conditions in induction motors, even these small sensors may lag significantly in tripping the overload protector. During this lag, the temperature of the apparatus being protected may overshoot the preselected trip temperature by a considerable margin. Thus, in order to prevent damage to the electrical apparatus, it has typically been necessary to allow an appreciable margin between the preselected trip temperature and the maximum temperature which could in fact be tolerated. Since the thus reduced trip temperature also limits the temperature at which a motor can be operated under steady state conditions, the need for a lowered trip threshold has also in effect reduced the maximum power rating of a given motor to which the overload protection was applied.

Among the several objects of the present invention may be noted the provision of a thermal sensor for an overload protector, which sensor provides an accelerated or anticipatory response when subjected to rapid rates of temperature rise thereby preventing excursions of temperature beyond a preselected trip level; the provision of such a sensor which is compatible with existing overload protectors designed for use with single thermistors; the provision of such a sensor which does require a reduction of the ultimate temperature trip point; the provision of such a sensor which is easily installed in electrical apparatus to be protected; the provision of such a sensor which is highly reliable; and the provision of such a sensor which is simple and relatively inexpensive. Other objects and features will be in part apparent and in part pointed out hereinafter.

Briefly, the present invention relates to a thermal sensor for controlling an overload protector which deenergizes electrical apparatus being protected in response to changes in sensor resistance. The sensor includes first and second thermistor elements each of which has a relatively low thermal inertia. The first thermistor element has a temperature coefficient of resistivity of a first type. The first and second thermistor elements are interconnected with the protector so that unopposed changes in the resistance of either element will actuate the protector. The sensor also includes a third thermistor element having a temperature coefficient of resistivity opposite in type to the first thermistor element and having a relatively large thermal inertia. The third thermistor element is interconnected with the first element so that changes in the resistance of the third element oppose the effects of changes of resistance in the first element. Accordingly, actuation of the protector by slow rates of rise of temperature is effected by changes in the resistance of the second element substantially independently of the resistance of the first and third elements but actuation of the protector in response to relatively rapid rates of rise of temperature is effected substantially by the change of resistance of the first element thereby providing an accelerated or anticipatory deenergization of the protected electrical apparatus upon rapid rises in temperature.

The invention accordingly comprises the apparatus hereinafter described, the scope of the invention being indicated in the following claims.

In the accompanying drawings, in which several of various possible embodiments of the invention are illustrated, FIG. 1 shows the physical construction of a thermal sensor according to the invention;

Corresponding reference characters indicate corresponding parts throughout the several views of the drawings.

Figure 1:
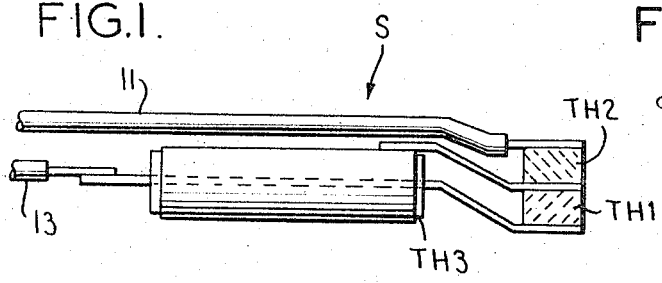

In FIG. 1 there is shown a thermal sensor S which includes three constituent thermistor elements TH1, TH2 and TH3. Each thermistor element TH1 and TH2 has a positive temperature coefficient (PTC) of resistivity and is of relatively low mass and thermal inertia. Thermistor element TH3 has a negative temperature coefficient (NTC) of resistivity, that is, it is opposite in type to element TH1, and is of a construction which is of relatively large mass and thermal inertia such as the coaxial form shown.

Figure 2:
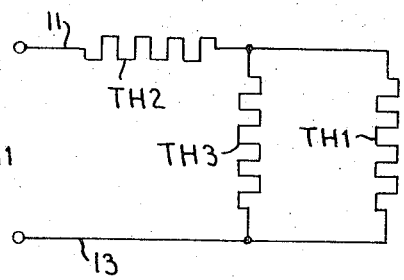
FIG. 2 is a circuit diagram illustrating the electrical interconnection of the various elements constituting the sensor of FIG. 1.

The thermistor elements TH1, TH2 and TH3 are interconnected between a pair of leads 11 and 13 in a two terminal series-parallel circuit or network as illustrated in FIG. 2. The thermistor element TH2 is connected in series with the parallel combination of TH1 and TH3. In other words, the NTC thermistor element TH3 shunts the PTC thermistor element TH1.

Figure 3:
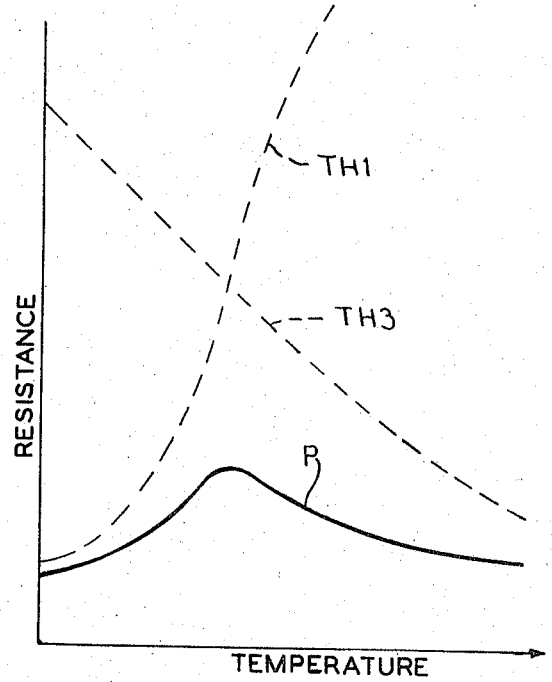
FIG. 3 is a graph representing the temperature-resistance characteristics of two of the thermistor elements included in the sensor of FIG. 1 and their combined characteristic when connected in parallel.

The resistance-temperature characteristic of the PTC thermistor element TH1 is represented in FIG. 3 by the curve marked TH1. This characteristic is substantially nonlinear and rises relatively sharply above a predetermined temperature, i.e., the transition point. The characteristic of the NTC thermistor element TH3 is represented by the curve marked TH3. The temperature-resistance characteristic of the parallel combination of the elements TH1 and TH3 is represented by the curve marked P. Since the elements TH1 and TH3 are connected in parallel, the resistance of the combination is lower than that of either of the constituent elements for all temperatures. As the resistance of the element TH1 begins to rise with increasing temperatures, its effect in the parallel combination is overridden by the decreasing shunt resistance of element TH2. It should be noted, however, that the curve P is based upon steady state conditions; that is, the temperatures of the elements TH1 and TH3 are permitted to become exactly equal for each temperature level plotted.

Figure 4:
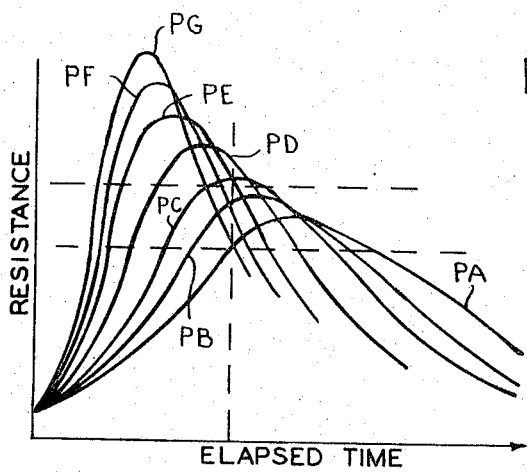
FIG. 4 is a graph representing the resistance behavior of the parallel-connected thermistor elements of FIG. 3 as a function of time for different rates of temperature rise.

If, on the other hand, the parallel combination of elements TH1 and TH3 is subjected to a rapidly rising ambient temperature, the temperature of the thermistor element TH3 will in fact appreciably lag that of thermistor element TH1 since the element TH3 possesses a greater mass and thermal inertia than element TH1. Accordingly, for rapid rates of temperature rise, the resistance of the element TH1 will rise to a substantial value before the resistance of the element TH3 falls to a level which would shunt and in effect cancel this rise in resistance. In FIG. 4 the resistance of the parallel combination of TH1 and TH3 is represented as a function of time for a series of different rates of temperature rise, the curves PA-PG representing successively increasing rates of temperature rise. As may be seen, increasing the rate of temperature rise not only causes the curve to shift to the left, but it also causes the peak value of the curve to increase significantly since the resistance of the PTC element TH1 rises to increased levels before it is opposed and shunted by the decreasing resistance of the element TH3 which warms more slowly due to its larger thermal inertia.

Figure 5:
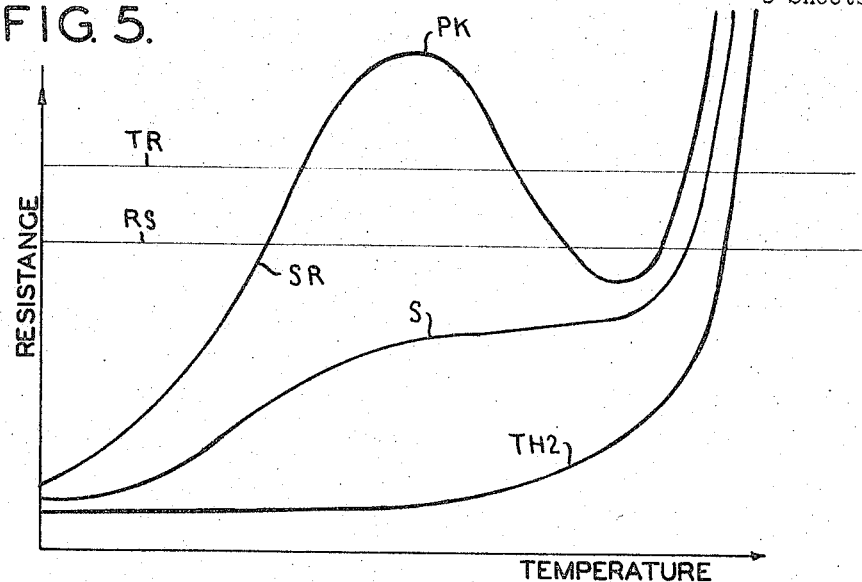
FIG. 5 is a graph representing the resistance-temperature characteristic of the third of the constituent elements of the sensor of FIG. 1 and the characteristics of the complete sensor for steady state temperatures and for a rapid rate of rise of temperature.

The temperature-resistance characteristic of the thermistor TH2 is represented in FIG. 5 by the curve marked TH2. The material of this thermistor element is chosen to have a higher transition point than that of the thermistor element TH1 so that the abrupt rise in its resistance characteristic occurs at a higher temperature than that of thermistor element TH1. The element TH2 establishes the ultimate trip temperature at which the sensor S will actuate an overload protector under steady state conditions. As may be seen from FIG. 2, the thermistor element TH2 is connected in series with the parallel combination of elements TH1 and TH3.

The temperature-resistance characteristic of the entire three element combination which constitutes sensor S is represented on the graph of FIG. 5 by the curve marked S. As with the curve P of FIG. 3, the curve S of FIG. 5 represents the steady state behavior of the sensor S, all of the constituent elements being at thermal equilibrium. For rapidly rising temperatures, however, the behavior of sensor S is quite different and this behavior is represented in FIG. 5 by the curve SR. Curve SR includes a peak PK which is due to the increased resistance contributed to the total resistance of sensor S by the parallel combination of elements TH1 and TH3 under conditions of rapid temperature rise. The peak of the curve is not shifted to the left as are the higher peaks shown in FIG. 4 since the curves in FIG. 5 are plotted with regard to ambient temperature rather than as a function of time for the increasing temperature characteristic.

Figure 6:
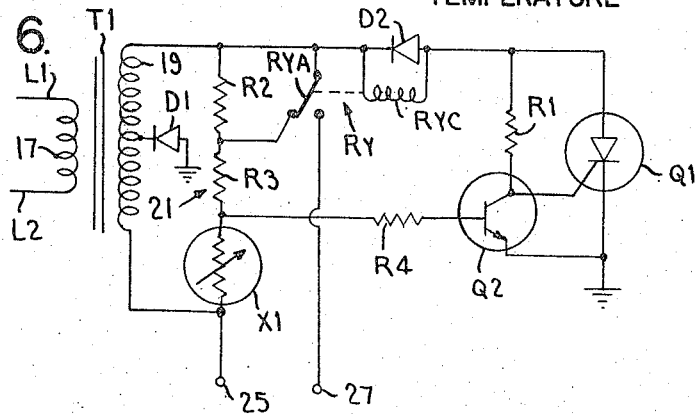
FIG. 6 is a schematic circuit diagram illustrating an overload protector employing the sensor of FIG. 1.

FIG. 6 illustrates an overload protector which is responsive to changes in sensor resistance for deenergizing a motor or other apparatus if it should overheat. A.C. power for energizing the protective apparatus is obtained through a pair of leads L1 and L2 from a suitable source or supply means (not shown). Leads L1 and L2 are connected to the primary winding 17 of a transformer T1 which also includes a center tapped secondary winding 19. The secondary center tap is connected to ground through a diode D1.

The coil RYC of a relay RY is connected between one side of the secondary winding 19 and ground through a circuit which includes the anode-cathode circuit of an SCR (silicon controlled rectifier) Q1. A diode D2 shunts coil RYC in a conventional manner for the purpose of eliminating chatter on alternate A.C. half cycles when the SCR Q1 is reverse-baised. Triggering current is provided to the gate of the SCR Q1 through a resistor R1 which extends from the SCR's anode terminal to its gate terminal. The gate-cathode circuit of SCR Q1 is shunted by the collector-emitter output circuit of an NPN transistor Q2.

Connected across the entire secondary winding 19 is a voltage divider 21 which includes a pair of resistors R2 and R3 and a sensor impedance X1 which represents, for example, the impedance of sensor S. Resistor R2 is selectively shunted by the normally-closed side of a set of contacts RYA which is operated by the relay coil RYC. The junction between resistor R3 and the impedance X1 is connected, through a current limiting resistor R4, to the base terminal of transistor Q2.

A pair of terminals 25 and 27 is provided for connection to a contactor which, when energized, applies power to an energizes the electric motor or other apparatus being protected. Terminal 25 is connected to one side of secondary winding 19 and the other terminal 27 is selectively connected to the other side of winding 19 by means of the normally-open side of contacts RYA.

The operation of this circuit is as follows, only those A.C. half cycles during which SCR Q1 is forward biased being considered. When impedance X1 is of a low value relative to the resistances R2 and R3, the voltage divider 21 will reverse bias the base-emitter junction of transistor Q1 thereby cutting off conduction in its emitter-collector output circuit. The current flowing through resistor R1 will thus be free to trigger the SCR Q1 which will in turn energize relay RY. Energization of relay RY will close the normally-open side of contacts RYA and the contactor will be actuated to energize the motor or other apparatus. Thus, when the sensor impedance X1 is low, power can be applied to the motor.

On the other hand, if the sensor impedance X1 becomes relatively large in relation to the resistance provided by resistors R2 and R3, transistor Q2 will be forward biased. The emitter-collector output circuit of transistor Q1 will then shunt the current flowing through R1 away from the gate electrode of SCR Q1. Relay RY will thus be deenergized and the contactor will also be deenergized so that power is withdrawn from the motor.

Simultaneously with the deenergization of the contactor, the contacts RYA shunt the resistor R2. The shunting of this resistor shifts the balance of the voltage divider 21 and provides a differential in the operation of this protector circuit. The value of sensor impedance X1 must therefore drop to a level which is appreciably below the level at which deenergization of the motor was effected before the motor can again be reenergized. The value of sensor impedance above which this protector circuit will trip so as to deenergize the motor is indicated on the graph of FIG. 5 by the line TR and the impedance level at which the circuit will reset is indicated by the line RS.

Figure 7:
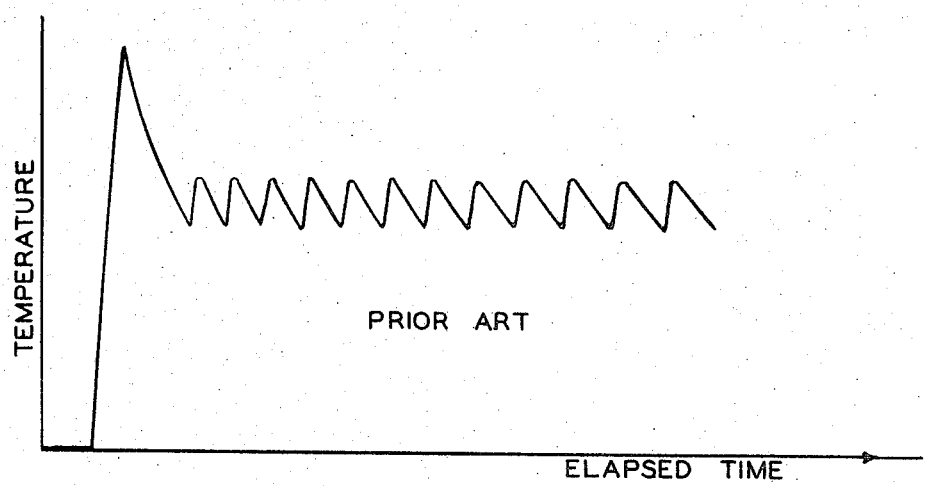
FIG. 7 is a graph representing the temperature behavior of an induction motor under locked rotor conditions provided with conventional thermistor overload protection.

If the circuit of FIG. 6 is controlled by a single thermistor constituting the empedance X1, which thermistor is embedded in a motor's winding to sense its temperature, adequate protection will be obtained for slow rates of temperature rise, i.e., so-called ultimate trip. However, for rapid rates of temperature rise such as occur under locked rotor conditions, the actual temperature of the windings may substantially overshoot the desired trip temperature. This is shown graphically in FIG. 7 wherein actual motor winding temperature is represented as a function of elapsed time for locked rotor conditions. It can be seen that the actual motor temperature rises rapidly to a high level, substantially above the desired trip level, before the motor is initially deenergized. The temperature then decreases until the reset point is reached whereupon the motor is reenergized. Upon being reenergized, the motor again heats and trips the protector circuit. However, since the motor heat has then had more time to distribute itself evenly, the temperature does not appreciably overshoot the desired trip point. Unless the motor is deenergized by some outside agency, it then recycles repetitively within the differential temperature range established by the alternate shunting of resistor R2.

Figure 8:
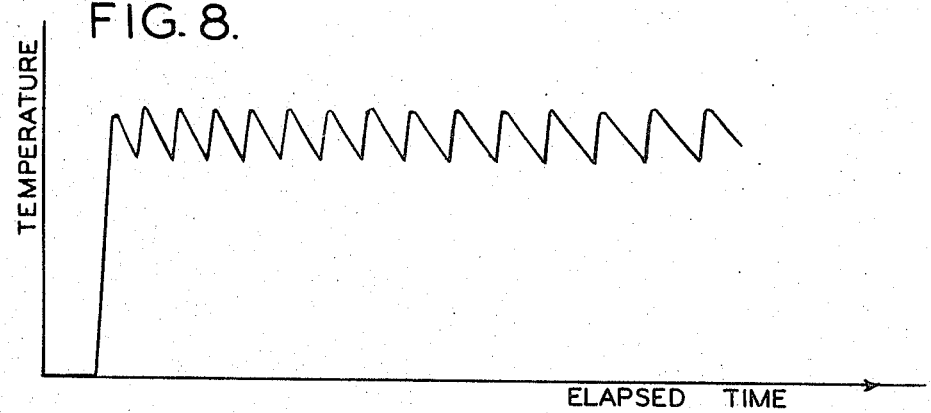
FIG. 8 is a graph representing the temperature behavior of the same motor under locked rotor conditions when protected by apparatus including a sensor according to the present invention.

The curve in FIG. 8 represents motor winding temperature as a function of elapsed time under locked rotor conditions when the thermal conditions within the motor are sensed by the sensor S of the present invention which then constitutes the sensor impedance X1 in the protector circuit of FIG. 6. Upon initial energization, the motor temperature rises rapidly. The sensor impedance therefore follows the characteristic indicated at SR in FIG. 5, rather than that indicated at S, and the protector circuit is tripped at an earlier time and at a lower ambient temperature than would be the case if the element TH2 alone were operative. Thus, the actual temperature of the winding, which is typically higher than that of the sensor itself under rapid temperature rise conditions, will not appreciably exceed the desired ultimate trip temperature and thus the curve of FIG. 8 does not exhibit the pronounced initial overshoot of the curve of FIG. 7.

With the danger of initial overshoot thus removed, the ultimate trip level may be set to a higher level than that possible with conventional protection without risking over-temperature damage and in this way, more power may be obtained from a given motor construction.

While the sensor S provides the advantages of anticipatory response as described above, it should be noted that the addition of this feature does not appreciably disturb the ultimate trip characteristics as obtainable by a single thermistor. Under slow temperature rise conditions, the resistance of sensor S substantially follows the curve S of FIG. 5 and it can be seen that tripping of the protector is substantially under the control of element TH2 alone. The slight offset present is essentially equivalent to a small fixed resistance in series with element TH2 and is easily compensated for in the choice of materials and trip point.

It should be noted also that the use of the sensor S of FIG. 1 involves the connection of only two leads to the overload protector and that sensor S can thus be easily installed and can be substituted for single thermistors for use with apparatus of the type illustrated in FIG. 6 and other conventional protectors known in the art.

Figure 9:
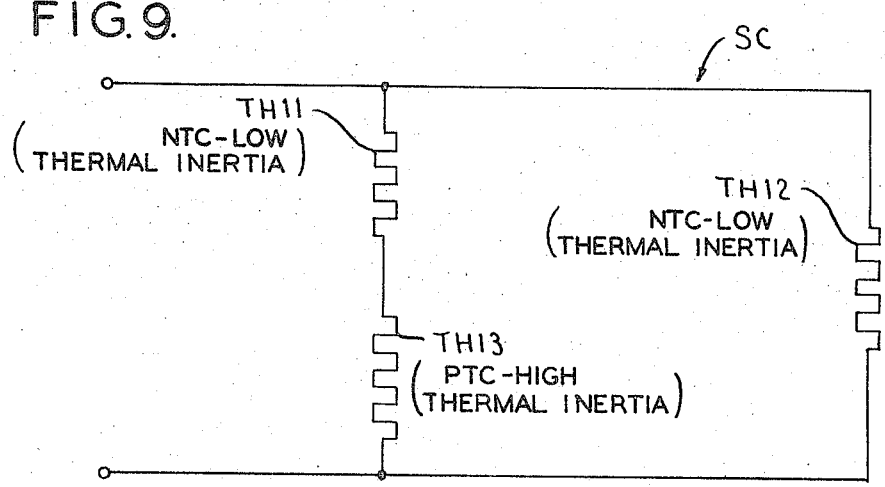
FIG. 9 is a circuit diagram illustrating the interconnection of constituent elements of another embodiment of the thermal sensor according to the invention.

FIG. 9 illustrates the arrangement of a sensor SC which is essentially a complement to the sensor S of FIGS. 1 and 2. Whereas the sensor S operates to trip a protector upon an increase in resistance, the sensor SC operates in a decreasing resistance mode to operate a protector upon a drop in resistance below a preselected threshold. The protector circuit shown in FIG. 6 may, for example, be readily adapted to be controlled by a sensor which operates in a decreasing resistance mode by reversing the positions of the sensor impedance X1 and the resistor R3 in the voltage divider 21.

Sensor SC includes three thermistor elements TH11, TH12 and TH13. Thermistors TH11 and TH12 have negative temperature coefficients of resistivity and are of relatively low thermal mass or inertia. Thermistor element TH13 has a positive temperature coefficient of resistivity and a relatively high thermal inertia. Thermistor elements TH11 and TH13 are connected in series so that their resistances are additive. Thus, on slow rates of temperature rise, decreases in the resistance of thermistor element TH11 are opposed and essentially cancelled by increases in the resistance of thermistor element TH13 which effectively isolates the element TH11. Accordingly, on slow rates of temperature rise it is a decrease in the resistance of the thermistor element TH12 which ultimately pulls the resistance of sensor SC below the threshold and actuates the protector.

On rapid rates of temperature rise, however, the temperature of the thermistor element TH13 will tend to lag substantially behind that of thermistor element TH11 because of their differences in thermal inertia. Accordingly, the resistance of thermistor TH11 can drop to a relatively low level before the resistance of thermistor TH13 rises appreciably. Thus, for rapid rates of temperature rise, the conductance of each of the parallel legs of sensor SC will contribute substantially to the decrease in sensor resistance and the tripping of the protector will occur at a substantially earlier time than if the thermistor element TH12 were operating alone.

While thermistor elements of large mass have been shown as means of obtaining a lagging response, a high thermal inertia can also be effectively obtained by insulating the particular thermistor elements so that there is a delay before they are affected by changes in ambient temperature. It should also be understood that multiple sensors according to the invention may be used to control a motor protector so that the occurrence of so-called hot spots will not escape detection. Multiple input control circuits suitable for such usage are shown in my copending and coassigned application, Ser. No. 430,006, filed Feb. 3, 1965, for Control Apparatus. With such multiple input control circuits, the anticipating thermistor elements and the ultimate trip sensing elements may be connected respectively to different control inputs.

In view of the above, it will be seen that the several objects of the invention are achieved and other advantageous results attained.

As various changes could be made in the apparatus described above without departing from the scope of the invention, it is intended that all matter contained in the above description or shown in the accompanying drawings shall be interpreted as illustrative and not in a limiting sense.

What is claimed is:

1. A thermal sensor for controlling an overload protector which deenergizes electrical apparatus in response to changes in sensor resistance, said sensor comprising:
    first and second thermistor elements each having a relatively low thermal inertia, said first and second elements being interconnected with said protector so that unopposed changes in the resistance of either element will actuate said protector, said first thermistor element having a temperature coefficient of resistivity of a first type; and
    a third thermistor element having a temperature coefficient of resistivity opposite in type to said first thermistor element and having a relatively large thermal inertia, said third thermistor element being interconnected with said first element so that changes in the resistance of said third element oppose the effects of changes of resistance in said first element whereby actuation of said protector by slow rates of rise of temperature is effected by changes in the resistance of said second element substantially independently of the resistance of said first and third elements but actuation of said protector in response to relatively rapid rates of rise of temperature is effected substantially by the change of resistance of said first element thereby providing an accelerated deenergization of said electrical apparatus upon rapid rises in temperature.

2. A thermal sensor as set forth in claim 1 wherein said first and second thermistor elements have positive temperature coefficients of resistivity and said third thermistor element has a negative temperature coefficient of resistivity.

3. A thermal sensor as set forth in claim 1 wherein said first and second thermistor elements have negative temperature coefficients of resistivity and said third thermistor element has a positive temperature coefficient of resistivity.

4. A thermal sensor as set forth in claim 1 wherein said third thermistor element is of substantially greater mass than said first thermistor element.

5. A thermal sensor as set forth in claim 1 wherein said third thermistor element includes thermal insulation for increasing its thermal inertia.

6. A thermal sensor as set forth in claim 1 wherein said thermistor elements are interconnected in a two terminal network.

7. A thermal sensor for controlling an overload protector which deenergizes electrical apparatus in response to changes in sensor resistance, said sensor comprising:

first and second thermistor elements each having a tempertaure coefficient of resistivity of a first type and having a relatively low thermal inertia, said first and second elements being interconnected with said protector so that unopposed changes in the resistance of either element will actuate said protector; and a third thermistor element having a temperature coefficient of resistivity opposite in type to said first and second thermistor elements and having a relatively large thermal inertia, said third thermistor element being interconnected with said first and second elements so that changes in the resistance of said third element oppose the effects of changes of resistance in said first element whereby actuation of said protector by slow rates of rise of temperature is effected by changes in the resistance of said second element substantially independently of the resistance of said first and third elements but actuation of said protector in response to relatively rapid rates of rise of temperature is effected substantially by the combined changes of resistance of said first and second elements thereby providing an accelerated deenergization of said electrical apparatus upon rapid rises in temperature.

8. A thermal sensor for controlling an overload protector which deenergizes electrical apparatus in response to changes in sensor resistance above a preselected threshold, said sensor comprising:

first and second thermistor elements connected in series, each of said elements having a positive temperature coefficient of resistivity and a relatively low thermal inertia, unopposed increases in the resistance of either element being operative to actuate said protector; and a third thermistor element shunting said first thermistor element, said third thermistor element having a negative tempertaure coefficient of resistivity and a relatively large thermal inertia whereby, for slow rates of temperature rise, the increasing resistance of said first thermistor element will be effectively shunted by the decreasing resistance of said thermistor element and said protector will be actuated substantially solely by the increase in resistance of said second thermistor element but, for rapid rates of temperature rise, the thermal lag of said third thermistor element will permit said first thermistor element to provide a substantial component of resistance in series with the resistance of said second thermistor element thereby actuating said protector at a substantially earlier time than would be effected by said second thermistor element alone.

9. A thermal sensor as set forth in claim 8 wherein said first and second thermistor elements have nonlinear temperature-resistance characteristics, there being a respective temperature for each above which the resistance of the respective element rises abruptly, the said temperature for said second element being greater than that for said first element.

10. A thermal sensor for controlling an overload protector which deenergizes electrical apparatus in response to changes in sensor resistance going below a preselected threshold, said sensor comprising:

first and second parallel circuit branches including respective first and second thermistor elements, each of said elements having a negative temperature coefficient of resistivity and a relatively low thermal inertia, unopposed decreases in the resistance of either element being operative to actuate said protector; and a third thermistor element in series with said first thermistor element in said first circuit branch, said third thermistor element having a positive temperature coefficient of resistivity and a relatively large thermal inertia whereby, for slow rates of temperature rise, the decreasing resistance of said first thermistor element will be effectively cancelled by the increasing resistance of said third thermistor element and said protector will be actuated substantially solely by the decrease in resistance of said second thermistor element but, for rapid rates of temperature rise, the thermal lag of said third thermistor element will permit said first thermistor element to provide a relatively low resistance in parallel with said second thermistor element thereby actuating said protector at a substantially earlier time than would be effected by said second thermistor element alone.

References Cited

UNITED STATES PATENTS

| | | | |
|---|---|---|---|
| 1,193,076 | 8/1916 | Schön | 317—41 X |
| 1,411,311 | 4/1922 | Sullivan | 317—41 X |
| 2,834,920 | 5/1958 | Lennox et al. | 317—41 X |
| 3,241,026 | 3/1966 | Andrich | 317—41 X |

MILTON O. HIRSHFIELD, *Primary Examiner.*

R. V. LUPO, *Assistant Examiner.*